US012520088B2

(12) United States Patent
Birnbaum et al.

(10) Patent No.: US 12,520,088 B2
(45) Date of Patent: Jan. 6, 2026

(54) COMMUNICATION DEVICE, TERMINAL HEARING DEVICE AND METHOD TO OPERATE A HEARING AID SYSTEM

(71) Applicant: Intel Corporation, Santa Clara, CA (US)

(72) Inventors: David Birnbaum, Modiin (IL); Ofir Degani, Haifa (IL); Arnaud Pierres, Menlo Park, CA (US); Oren Haggai, Kefar Sava (IL); Amy Chen, San Jose, CA (US); Revital Almagor, Moshav Beit Oved (IL); Darryl Adams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 17/560,320

(22) Filed: Dec. 23, 2021

(65) Prior Publication Data

US 2023/0209282 A1 Jun. 29, 2023

(51) Int. Cl.
*H04R 25/00* (2006.01)

(52) U.S. Cl.
CPC ......... *H04R 25/507* (2013.01); *H04R 25/554* (2013.01); *H04R 25/70* (2013.01); *H04R 2225/55* (2013.01)

(58) Field of Classification Search
CPC .... H04R 25/507; H04R 25/554; H04R 25/70; H04R 2225/55
See application file for complete search history.

(56) References Cited

U.S. PATENT DOCUMENTS

| | | | | |
|---|---|---|---|---|
| 2008/0025538 A1* | 1/2008 | Zad-Issa | H04R 25/43 | 381/315 |
| 2015/0326984 A1* | 11/2015 | Haubrich | H04R 25/554 | 381/315 |
| 2017/0295439 A1* | 10/2017 | Xu | H04R 25/407 | |
| 2018/0342320 A1* | 11/2018 | Westermann | H04R 25/505 | |
| 2019/0261102 A1 | 8/2019 | Foo et al. | | |
| 2019/0379986 A1 | 12/2019 | Vendelbo | | |

FOREIGN PATENT DOCUMENTS

| | | | |
|---|---|---|---|
| EP | 4203513 A1 * | 6/2023 | H04R 25/507 |
| WO | WO-2022051032 A1 * | 3/2022 | H04R 25/04 |

OTHER PUBLICATIONS

Partial European Search Report for corresponding European Patent Application No. 22200816.1, dated May 2, 2023, 13 pages (for informational purposes only).
EP Communication from the Examining Division for subsequent Application EP 22 200 816.1, dated Jun. 6, 2025, 8 pages (for reference purpose only).

* cited by examiner

*Primary Examiner* — Sunita Joshi
(74) *Attorney, Agent, or Firm* — Viering, Jentschura und Partner mbB

(57) ABSTRACT

A method for operating a hearing aid system, the method including: providing an audio stream from a first communication device to a first terminal hearing device through a first wireless communication link, and wherein the audio stream is based on a personalized audibility feature of a predetermined user and an audio reproduction feature of the terminal hearing device; set up a second wireless communication link between the first terminal hearing device and a second communication device; providing the second audio stream through the second wireless communication link, and terminating at least the audio stream of the first communication link.

20 Claims, 7 Drawing Sheets

COMMUNICATION DEVICE, TERMINAL HEARING DEVICE AND METHOD TO OPERATE A HEARING AID SYSTEM

TECHNICAL FIELD

This disclosure generally relates to hearing aid systems.

BACKGROUND

According to the World Health Organization (WHO) one in five people in the world today experience some level of hearing loss (slight to profound). Nearly 80% of people with hearing loss live in low to middle income countries. Hearing aids with Bluetooth capabilities are gaining popularity. These devices connect seamlessly to phones and other Bluetooth (BT)-enabled Internet of Things (IoT)/Wearable devices.

Hearing aids supporting the new Bluetooth Low Energy (BT LE) protocol will soon be able to connect directly to personal computers (PC). BT-capable hearing aids of the related art are expensive (~USD 3000-USD 5000), and, hence, are inaccessible to the majority of the global population experiencing degrees of hearing loss. People with hearing impairment experience disadvantages when participating in online communication and other audio-based computing tasks. These communication barriers have been recently amplified due to remote school and work model adopted in response to Covid-19.

In BT-enabled hearing aids of the related art, all audio processing and adaptation to personal audibility curves are carried out in the hearing aids. Further related art uses artificial intelligence (AI) mechanism to improve speech recognition. In further related art, a personal computer (PC) transmits raw audio streams to headphones.

People regularly switch phone calls between communication devices, e.g. switch from a personal computer (PC) to a phone if user needs to drive during a phone call. In this example, the handover from the PC to the phone can be done in a manual manner by the user. In case of an enabled hand over even more manual steps are required. Further, people use multiple communication devices with different headsets during the day, e.g. using airpods with the phone and the PC, as well with multiple applications, each with unique audio needs (also denoted as audio profiles).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The following detailed description refers to the accompanying drawings that show, by way of illustration, specific details and examples in which the disclosure may be practiced. One or more examples are described in sufficient detail to enable those skilled in the art to practice the disclosure. Other examples may be utilized and structural, logical, and electrical changes may be made without departing from the scope of the disclosure. The various examples described herein are not necessarily mutually exclusive, as some examples can be combined with one or more other examples to form new examples. Various examples are described in connection with methods and various examples are described in connection with devices. However, it may be understood that examples described in connection with methods may similarly apply to the devices, and vice versa. Throughout the drawings, it should be noted that like reference numbers are used to depict the same or similar elements, features, and structures.

Illustratively, a personal audibility feature (PAF) file corresponding to a distinct user audibility feature-terminal hearing device pair is transmitted to multiple devices, to support the use of different communication devices as audio sources for the terminal hearing device as the user is walking around.

Figure 1A:
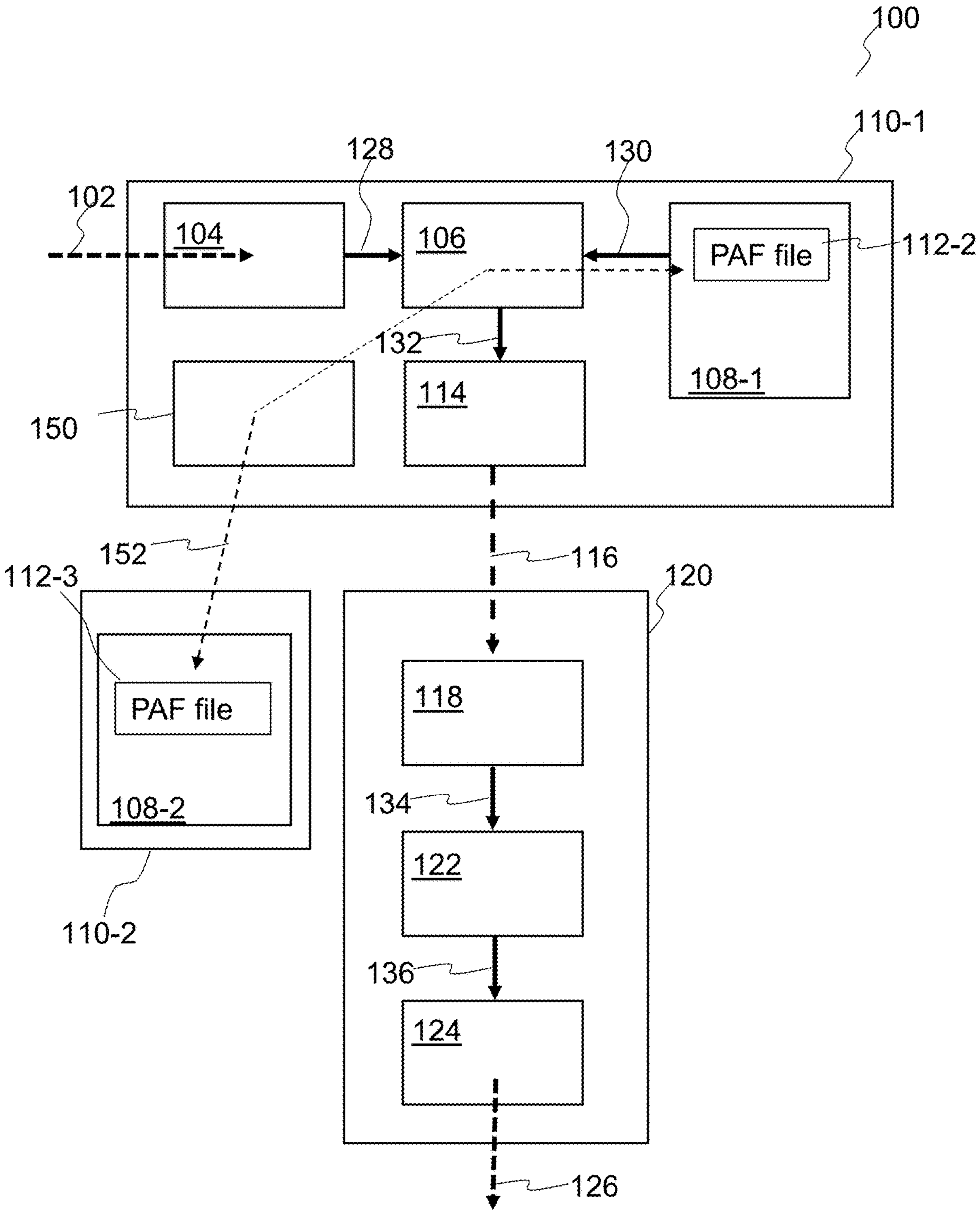
FIG. 1A and FIG. 1B illustrate exemplary schematic diagrams of hearing aid systems.
Figure 1B:
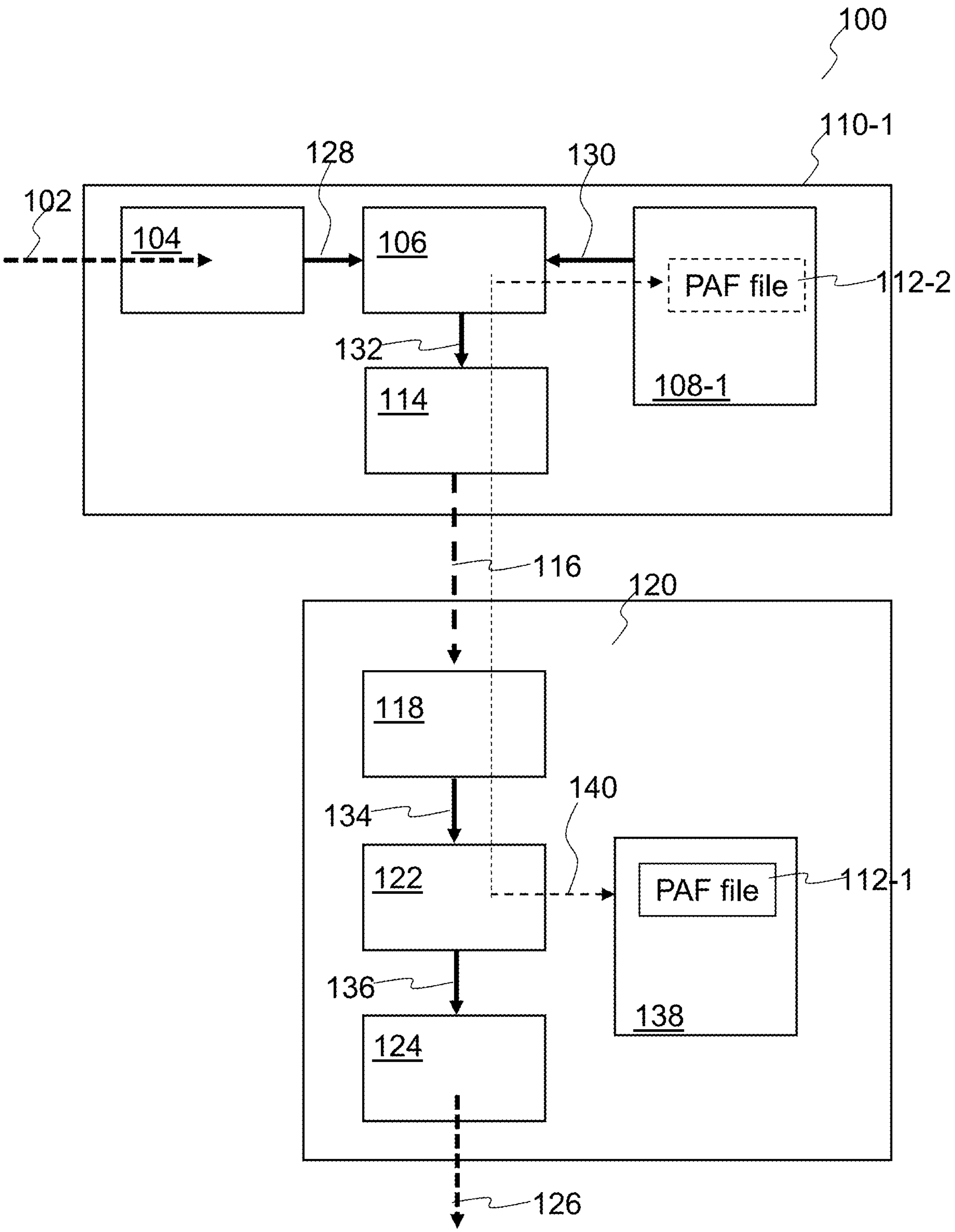

FIG. 1A and FIG. 1B illustrate hearing aid systems 100. The hearing aid system 100 includes at least one communication device 110-1 (also denoted as first communication device 110-1) coupled to a terminal hearing device 120. Illustratively, the hearing aid system 100 employs as such conventional terminal hearing devices 120, e.g. ear buds, headphones, etc., but the audio processing, the corresponding artificial intelligence (AI), if applicable, the personal audibility curve and the acoustic setup of the terminal hearing device 120 are outsourced to the first communication device 110-1 that is external to the terminal hearing device 120. A Personal Audibility Feature (PAF) file 112-2 stored in a memory of the first communication device 110-1 facilitates the outsourcing for the specified user of the hearing aid system 100 using the specific terminal hearing device 120. Thus, a low cost hearing aid system 100 can be provided. Further, an adaptation and improved tailored audio quality is provided for a wide range of users, e.g. improved tuning, improved AI feature set for speech recognition and clarity, improved noise cancelling, improved feedback suppression, and/or improved binaural link. Illustratively, the hearing aid system 100 enables the use of lower cost ear buds (<USD 200) as terminal hearing device 120 as an alternative to hearing aids of the related art, when connected to the first communication device 110-1. This way, a larger portion of the population with hearing loss or impairment gains access to improved hearing when using the first communication device 110-1.

The PAF file 112-2 may be shared between a plurality of communication devices 110-1, 110-2, e.g. via a server, e.g. a cloud server. Thus, different communication devices 110-1, 110-2 supporting a hearing aid application (in the following also denoted as App) using the PAF file 112-2 can be used. As an example, as illustrated in FIG. 1A, the first communication device 110-1 may transmit a copy 112-3 of the PAF file 112-2, e.g. an updated version of the PAF file 112-2 to each communication device of the user using the hearing aid App. This is exemplary illustrated in FIG. 1A for the second communication device 110-2.

As an example, the first communication device 110-1 (e.g. a computer) may transmit 152 a PAF file 112-2 to the second communication device 110-2 (e.g. a smartphone), e.g. a copy 112-3 of the PAF file 112-2, when the terminal hearing device 120 forms a wireless communication link with the second communication device 110-2 (illustratively, the wireless communication link forms a trigger for the second communication device 110-2 to fetch a copy 112-3 of the PAF file 112-2 from the first communication device 110-1). Conversely, the first communication device 110-1 (e.g. the computer) may receive 152 the PAF file 112-2 from the second communication device 110-2 (in this case, the PAF file 112-2 was originally stored in the second communication device 110-2), e.g. a copy 112-3 of the PAF file 112-2, when the terminal hearing device 120 forms a wireless communication link with the second communication device 110-2 (illustratively, the wireless communication link forms a trigger for the second communication device 110-2 to transmit a copy 112-3 of the PAF file 112-2 to the first communication device 110-1). Alternatively, or in addition, the first communication device 110-1 may transmit 152 a copy 112-3 of the PAF file 112-2 to the second communication device 110-2 when the terminal hearing device 120 forms a wireless communication link with the first communication device 110-1 (illustratively, the wireless communication link forms a trigger for the first communication device 110-1 to transmit a copy 112-3 of the PAF file 112-2 to the second communication device 110-2). Conversely, the first communication device 110-1 may receive 152 a copy 112-3 of the PAF file 112-2 from the second communication device 110-2 when the terminal hearing device 120 forms a wireless communication link with the first communication device 110-1 (illustratively, the wireless communication link forms a trigger for the first communication device 110-1 to fetch a copy 112-3 of the PAF file 112-2 from the second communication device 110-2).

In other words, the second communication device 110-2 may provide a copy 112-3 of the PAF file 112-2 to the first communication device 110-1 via a first communication terminal interface 150 in case the first communication device 110-1 reports a wireless communication link with the predetermined terminal hearing device 120 to the second communication device 110-2 via the first communication terminal interface 150. The first communication device 110-1 may be configured to transmit a copy 112-3 of the PAF file 112-2 stored in the memory 108-1 to the second communication device 110-2 in case the first communication device 110-1 has established a communication link with the predetermined terminal hearing device 120. The first communication device 110-1 may be configured to transmit a copy 112-3 of the PAF file 112-2 stored in the memory 108 to the terminal hearing device 120 in case the first communication device 110-1 has established a communication link with the predetermined terminal hearing device 120.

Alternatively, or in addition, a copy 112-1 of the PAF file 112-2 stored in the memory 108-1 of the first communication device 110-1 may be stored in a memory 138 of the terminal hearing device 120. This is illustrated in FIG. 1B. The first communication device 110-1 may thus store a copy 112-1 of the PAF file 112-2 stored in the memory 108 of the first communication device 110-1 in the memory 138 of the terminal hearing device 120. Conversely, the terminal hearing device 120 may store a copy 112-1 of the PAF file 112-2 stored in the memory 138 of the terminal hearing device 120 in the memory 108-1 of the first communication device 110-1. The version of the PAF file 112-2 to be used for the audio processing and stored in the memory 108-1 of the first communication device 110-1 may depend on an indicator in the PAF files 112-2. Reference numerals 112-1, 112-3 indicate a most recent version of the PAF file 112-2 distributed among the communication devices 110-1, 110-2 (and optionally the terminal hearing device 120).

Thus, the PAF file 112-2 stored in the memory 108 of the first communication device 110-1 and used for providing the processed audio signal to the terminal hearing device 120 may be stored in the memory 108-1 of the first communication device 110-1. This PAF file 112-2 may be generated directly in the first communication device 110-1, may be provided by another communication device 110-2 (illustrated in FIG. 1A), or may be provided by the terminal hearing device 120 (illustrated in FIG. 1B).

In general, e.g. considering any example illustrated in FIG. 1A, FIG. 1B, or any combination thereof, the PAF file 112-2 may include one or more personal auditability features of the predetermined user and audio reproduction feature of the (associated) terminal hearing device 120.

As an illustrative example, the PAF file 112-2 may include audiograms, but also other features, e.g. phonetic recognition tests of a user, e.g. hearing in noise test (HINT) and/or words in noise (WIN) test. As an example, the PAF file 112-2 may have the following content: terminal hearing device identification, user audiogram(s), user WIN/HINT test results. These test results can be used automatically to trim the various audio algorithms, e.g., equalizer, frequency compression, AI-based speech enhancement, as an example. The PAF file 112-2 may also include target audio correction algorithm coefficients (for known algorithms). The target audio correction algorithm coefficients may be trimmed manually by an audiologist or the user of the hearing aid system. The communication device 110-1 may support using new algorithms for hearing aid. The new algorithms may use raw test data stored in the PAF file 112-2 and may store target audio correction algorithm coefficients in follow up revisions in the PAF file 112-2.

The first communication device 110-1 may be configured to determine the personal auditability feature by the user using the terminal hearing device 120, e.g. in a software program product or module of the hearing aid application. As an example, the first communication device 110-1 may provide a hearing in noise test (HINT) and/or a words in noise (WIN) test, e.g. using a chat robot guiding through the procedure, to determine a personal audibility curve, e.g. a personal equal loudness contour according to ISO 226:2003, that is stored in PAF file. Alternatively, or in addition, the calibration of the PAF file 112-2 may be performed by an audiologist connecting to the application program running on the first communication device 110-1, to guide the test procedure.

Each user of the hearing aid system 100 has a specific hearing profile saved in the PAF file 112-2 that is specific for each combination (user and terminal hearing device). The personal audibility feature profiles may be frequency dependent. Each PAF file 112-2 may address a user specific expected communication device 110-1, 110-2 response with respect to the respective(ly) (associated) terminal hearing device 120.

The PAF file 112-2 may further include audio reproduction feature of the terminal hearing device 120 allowing an improved user-terminal hearing device-pair specific audio processing. Further, an identification of the terminal hearing device 120 is stored in the PAF file 112-2, and thus allows a fast and reliable communication connection of the terminal hearing device 120 to one or more communication devices 110-1, 110-2.

The user may amend the PAF file 112-2, e.g. amend an audio preference profile. As an example, the communication device 110-1, 110-2 may personalize the hearing thresholds per user and terminal hearing device 120, e.g. generate an audibility preference profile stored in the PAF file 112-2. The first communication device 110-1 may define the PAF file 112-2 specific to the hearing impairment of the user of the hearing aid system 100 and the audio reproduction feature(s) of the terminal hearing device 120.

The PAF file 112-2 may be a single sharable file that may include the personal auditability feature of the user and the audio reproduction feature of the terminal hearing device 120. As an example, the personal auditability feature may include a personal audibility curve. Further, the personal auditability feature may include at least one personal audibility preference profile. The personal audibility preference profile may include a hearing preference of the predetermined user. As an example, a personal audibility preference profile may include information correlated to a processing based on the scene of the hearing aid system, e.g. audio filter and amplification settings for different surroundings (e.g. a different audio setting in public transportation and for conversations), and/or an individual tuning setting, e.g. a preference to amplify hearing frequency stronger than required from the personal audibility curve, as an example.

The audio reproduction feature may include information of a unique ID, a name, a network address and/or a classification of the terminal hearing device 120. The audio reproduction feature may also include an audio mapping curve of the speaker 124 of the terminal hearing device 120. In this example, an audio mapping curve may be understood as an acoustic reproduction accuracy of a predetermined audio spectrum by the speakers of the terminal hearing device 120.

In other words, FIG. 1A illustrates an example in which the first communication device 110-1 coupled to the terminal hearing device 120 transmits a copy 112-3 of the PAF file 112-2 stored e.g. in a memory 108-1 of the first communication device 110-1 to the second communication device 110-2 (the second communication device 110-2 may have the same components as the first communication device 110-1 regarding the hearing aid functionality although only a memory 108-2 of the second communication device 110-2 is illustrated in FIG. 1A). Alternatively, a first communication device 110-1 coupled to a terminal hearing device 120 receives a copy 112-3 of the PAF file 112-2 stored e.g. in a memory 108-2 of the second communication device 110-2, e.g. a Cloud server 110-2, to the first communication device 110-1 when the first communication device 110-1 becomes aware of the presence of terminal hearing device 120.

Alternatively, or in addition, FIG. 1B illustrates an example in which the PAF file 112-2 may be stored on the terminal hearing device 120, and the terminal hearing device 120 transmits a copy 112-1 of the PAF file 112-1 to the first communication device 110-1. As an example, the terminal hearing device 120 may provide a copy 112-3 of the PAF file 112-2 stored in the memory 138 of the terminal hearing device 120 to the memory 108-1 of the first communication device. In case there is no communication link between the first communication device 110-1 and a second communication device 110-2, and/or the file version of the PAF file 112-2 of the terminal hearing device 120 is more recent than the file version of the PAF file 112-3 stored in the memory 108 of the first communication device. Conversely, the first communication device 110-1 may store a backup copy 112-1 (also denoted as remote copy) of the PAF file 112-2 in the memory 138 of the terminal hearing device 120. Here the memory 138 of the terminal hearing device 120 acts only as a transfer medium since the audio processing is performed in the first communication device 110-1.

However, the transfer of the PAF file illustrated in FIG. 1A and FIG. 1B may also be combined. As an example, the first communication device 110-1 may transmit a copy 112-3 of the PAF file 112-1 received from the terminal hearing device 120 to the second communication device 110-2. Conversely, the terminal hearing device 120 may receive a copy 112-1 of the PAF file 112-3 stored in the memory 108-2 of the second communication device 110-2 that is forwarded by the first communication device 110-1. Here, the first communication device 110-1 may store a copy 112-3 of the PAF file 112-2 from the second communication device 110-2.

Illustratively, the hearing aid system 100 shifts a remarkable portion of the computational effort and audio adaptation derived from a personal audibility curve of the user of the hearing aid system 100 to the communication device 110-1 and utilizes computing resources of the communication device 110-1. This enables higher quality enhanced audio and speech recognition for people with hearing impairment at an affordable cost, e.g. by using ear buds as terminal hearing devices 120. Moving the audibility curve of the user together with the characteristics of the associated terminal hearing devices 120 of the user), e.g. stored in the personal audibility feature (PAF) file 112-2 or a copy 112-1, 112-3 thereof, to the first communication device 110-1 allows the user to keep a personal setting which can be deployed across various communication devices 110-1, 110-2, e.g. audio peripherals, while keeping a record within the ecosystem of the user's devices.

As an example, in case the terminal hearing device 120 is to be coupled to the second communication device 110-2, the pairing process between the second communication device 110-2 and the terminal hearing device 120 may be improved if the second communication device 110-2 already knows the associated terminal hearing device 120 from the PAF file112-2. In this example, the second communication device 110-2 receives a copy 112-3 of the PAF 112-2 file from the first communication device 110-1, e.g. from a cloud server, when starting a respective hearing aid application on the second communication device 110-2 for the first time.

As another example, the user using the terminal hearing device 120 may establish a (e.g. wireless or wireline) communication connection to the second communication device 110-2 through his first communication device 110-1, and an audiologist may operate the second communication device 110-2 to calibrate the PAF file 112-2 that is stored as a copy 112-1 on the first communication device 110-1. Alternatively, the audiologist may connect to the first communication device 110-1 using the second communication device 110-2, and may perform the calibration of the PAF file 112-2, e.g. using a remote connection, e.g. via a virtual private network (VPN) connection.

In general, e.g. considering any example illustrated in FIG. 1A, FIG. 1B, or any combination thereof, a communication device 110-1, 110-2 may be any kind of computing device having a communication interface providing a communication capability with the terminal hearing device 120. By way of example, the first communication device 110-1 and/or the second communication device may include or be a terminal communication device such as a smartphone, a tablet computer, a wearable device (e.g. a smart watch), an ornament with an integrated processor and communication interface, a laptop, a notebook, a personal digital assistant (PDA), a PC, and the like.

A communication device, e.g. the first communication device 110-1 or the second communication device 110-2, may include at least one processor 106 coupled between a wireless communication terminal interface 114 and an audio source 104; and a memory 108 having the PAF file 112-2 stored therein and coupled to the processor 106.

The audio source 104 may be a microphone, as an example. However, the audio source 104 may be any kind of sound source, e.g. an audio streaming server. The processor 106 may be configured to provide an audio stream 132 to the wireless communication terminal interface 114 based on a received audio signal 102 using the audio source 104. As an example, the audio source 104 may provide a digital audio signal 128 associated with the received audio signal 102 from the scene (also denoted as environment) of the hearing aid system 100. As an example, the scene may provide a conversation between people, a public announcement, a telephone call, a television stream, and the like.

The processor 106 of the first communication device 110-1 coupled to the terminal hearing device 120 may provide personalized audio processing, e.g. amplifying and/or equalizing, of the audio signal 128 based on the PAF file 112-2 and a machine learning algorithm stored e.g. in the memory 108-1 (in FIG. 1A and FIG. 1B illustrated by a first arrow 130). Illustratively, the personalized audio processing of the audio signal corresponds to information stored in the PAF file 112-2. The personalized audio processing may include a linear processing, e.g. a linear equalizing, or non-linear, e.g. frequency compression. Illustratively, the PAF file 112-2 instantiates the sound algorithms and/or AI algorithms for a respective user and the associated respectively used terminal hearing device 120.

The first communication device 110-1 may include a communication interface 150 to communicate with another (second) communication device 110-2, e.g. to transmit or receive 152 a copy 112-3 of the PAF file 112-2 stored in the memory 108-1 of the first communication device 110-1. The communication interface 150 to communicate with the other communication device 110-2 may be the same as the communication interface 114 used to communicate with the terminal hearing device 120 or may be a different one.

In general, e.g. considering any example illustrated in FIG. 1A, FIG. 1B, or any combination thereof, the terminal hearing device 120 may include a wireless communication terminal interface 118 configured to be communicatively coupled to the wireless communication terminal interface 114 of the first communication device 110-1; a speaker 124 and at least one processor 122 coupled between the wireless communication terminal interface 118 and the speaker 124.

As described in FIG. 1B, the terminal hearing device 120 may use the a memory 138 (also denoted as storage) to locally store the PAF file 112-2 in the terminal hearing device 120, and transmit (or receive) 140 a copy 112-3 of the PAF file 112-2 to the first communication device 110-1 (or vice versa). The first communication device 110-1 may also work as relay station to transmit a copy 112-3 of the PAF file 112-2 to the second communication device 110-2 (not illustrated in FIG. 1A or FIG. 1B). As an example, each PAF file 112-2 may include a version indication, and an update process provides the latest version (also denoted as most recent version) of the PAF file to each of the plurality of communication devices 110-1, 110-2 (and optionally to the terminal hearing device 120).

Further in general, the processor 122 of the terminal hearing device 120 may be configured to provide a signal 136 to the speaker from the audio packets 134 provided by the wireless communication terminal interface 114. The speaker 124 provides a PAF-modified audio signal 126 to the predetermined user of the hearing aid system 100. In other words, the PAF-modified audio signal 126 may be a processed version of the audio signal 102. The processing is based on the information stored in the PAF file 112-2 in the first communication device 110-1 correlating to features of a hearing impairment of the user of the hearing aid system 100 and audio reproduction features of the terminal hearing device 120.

Further in general, the terminal hearing device 120 may include at least one earphone. The terminal hearing device 120 may be an in-the-ear phone (also referred to as earbuds), as an example. As an example, the terminal hearing device 120 may include a first terminal hearing unit and a second terminal hearing unit. As an example, the first terminal hearing unit may be configured for the left ear of the user, and the second terminal hearing unit may be configured for the right ear of the user, or vice versa. However, the user may also have only one ear, or may have only one ear having a hearing impairment or may be deaf in one ear. The terminal hearing device 120 may include a first terminal hearing unit that may include a first communication terminal interface 118 for a wireless communication link with the first communication device 110-1. Further, the first and second terminal hearing units may include second communication terminals respectively for a wireless communication link between the first and second terminal hearing units, e.g. a body area network. The terminal hearing device 120 may include or be any kind of headset that includes a communication terminal interface 118 for a wireless communication link with the communication device 110.

The wireless communication terminal interfaces 114, 118 of the first communication device 110-1and the terminal hearing device 120 may be configured as a short range mobile radio communication interface such as e.g. a Bluetooth interface, e.g. a Bluetooth Low Energy (LE) interface, Zigbee, Z-Wave, WiFi HaLow/IEEE 802.11ah, and the like. By way of example, one or more of the following Bluetooth interfaces may be provided: Bluetooth V 1.0A/1.0B interface, Bluetooth V 1.1 interface, Bluetooth V 1.2 interface, Bluetooth V 2.0 interface (optionally plus EDR (Enhanced Data Rate), Bluetooth V 2.1 interface (optionally plus EDR (Enhanced Data Rate), Bluetooth V 3.0 interface, Bluetooth V 4.0 interface, Bluetooth V 4.1 interface, Bluetooth V 4.2 interface, Bluetooth V 5.0 interface, Bluetooth V 5.1 interface, Bluetooth V 5.2 interface, and the like. Thus, illustratively, the hearing aid system 100 applies PAF on audio samples that go from or to Bluetooth Low Energy (BLE) audio (e.g. compressed) streams or any other as short range mobile radio communication audio stream as a transport protocol.

Illustratively, the first communication device 110-1 is a terminal hearing device-external device, e.g. a mobile phone, tablet, iPod, etc.) that transmits audio packets to the terminal hearing device 120. The terminal hearing device 120 streams audio from the first communication device 110-1, e.g. using an Advanced Audio Distribution Profile (A2DP). For example, a terminal hearing device 120 can use Bluetooth Basic Rate/Enhanced Data Rate™ (Bluetooth BR/EDR™) to stream audio streams from a smartphone (as first communication device 110-1) configured to transmit audio using A2DP. When transporting audio data, Bluetooth Classic profiles, such as the A2DP or the Hands Free Profile (HFP), offer a point-to-point link from the first communication device 110-1 to the terminal hearing device 120.

Thus, in the hearing aid system 100 the user-personalized audio processing of the hearing aid is outsourced to the first communication device 110-1. In addition, the PAF file 112-2 stored in the memory 108-1 of the first communication device 110-1 further considers features of the terminal hearing device 120 in the emitted amplified audio signal 126.

The first communication device 110-1 receives audio signals 102, e.g. a sound, from an audio source 104 and processes them in the processor 106 connected between the audio source 104 and the wireless communication terminal 114.

The processor 106 of the first communication device 110-1 may include a controller, computer, software, etc. The processor 106 processes the audio signal 102 in a user-terminal hearing device specific-manner. The processing can vary with frequency, e.g. according to the PAF file 112-2 stored in the memory 108-1 of the first communication device 110-1. This way, the communication device 110-1 provides a personalized audible signal to the user of the terminal hearing device 120.

As an example, the processor 106 amplifies the audio signal 102 in the frequency band associated with human speech more than the audio signal 102 associated with environmental noise. This way, the user of the hearing aid system can hear and participate in conversations.

The processor 106 may be a single digital processor 106 or may be made up of different, potentially distributed processor units. The processor 106 may be at least one digital processor 106 unit. The processor 106 can include one or more of a microprocessor, a microcontroller, a digital processor 106 (DSP), an application specific integrated circuit (ASIC), a field-programmable gate array (FPGA), discrete logic circuitry, or the like, appropriately programmed with software and/or computer code, or a combination of special purpose hardware and programmable circuitry. The processor 106 may be further configured to differentiate sounds, such as speech and background noise, and process the sounds differently for a seamless hearing experience. The processor 106 can further be configured to support cancellation of feedback or noise from wind, ambient disturbances, etc. The processor 106 can be configured to access programs, software, etc., which can be stored in a memory 108 in the communication device 110-1 or in an external memory, e.g. in a computer network, such as a cloud.

The processor 106 can further include one or more analog-to-digital (A/D) and digital-to-analog (D/A) converters for converting various analog inputs to the processor 106, such as analog input from the audio source 104, for example, in digital signals and for converting various digital outputs from the processor 106 to analog signals representing audible sound data which can be applied to the speaker, for example. The analog audio signal 102 generated by the audio source 104 may be converted to a digital audio signal 128 by an analog-to-digital (A/D) converter of the processor 106. The processor 106 may process the digital audio signal 128 to shape the frequency envelope of the digital audio signal 128 to enhance signals based on the PAF filed 112-2 stored in the memory 108-1 of the first communication device 110-1 to improve their audibility for a user of the hearing aid system 100.

As an example, the processor 106 may include an algorithm that sets a frequency-dependent gain and/or attenuation for the audio signal 102 received via the one or more audio source 104, e.g. microphone, of the communication device 110-1 based on the PAF file 112-2 stored in the memory 108-1 of the first communication device 110-1.

The processor 106 may also include a classifier, and a sound analyzer. The classifier analyzes the sound received by one or more audio source 104 of the first communication device 110-1. The classifier classifies the hearing condition based on the analysis of the characteristics of the received sound. For example, the analysis of the picked-up sound can identify a quiet conversation, talking with several people in a noisy location; watching TV; etc. After the hearing conditions have been classified, the processor 106 can select and use a program to process the received audio signal 102 according to the classified hearing conditions. For example, if the hearing condition is classified as a conversation in a noisy location, the processor 106 can amplify the frequency of the received audio signal 102 based on information stored in the PAF file 112-2 stored in the memory 108-1 of the first communication device 110-1 associated with the conversation and attenuate ambient noise frequencies.

The memory 108-1 of the communication device 110-1 storing the PAF file 112-2 may include one or more volatile, non-volatile, magnetic, optical, or electrical media, such as read-only memory (ROM), random access memory (RAM), electrically-erasable programmable ROM (EEPROM), flash memory, or the like.

The PAF file 112-2 stored in the memory 108-1 of the first communication device 110-1 may store tables with predetermined values, ranges, and thresholds, as well as program instructions that may cause the processor 106 to access the memory 108, execute the program instructions, and provide the functionality ascribed to it herein. The user of the hearing aid system 100 can also perform manual settings in the program, e.g. audio reproduction preferences. The parameters can be adjusted based on empirical values determined from the response of the user. The parameters may be stored as personal audibility preference profile in the PAF file 112-2.

As an example of a processor 106, the processor 106 is a device that provides amplification, attenuation, or frequency modification of audio signals 102, provided from the audio source 104 of the device of the communication device 110, transmitted to the terminal hearing device 120 to compensate for hearing loss or difficulty (also denoted as hearing impairment).

The processor 106 in combination with the PAF file 112-2 may be adapted for adjusting a sound level pressure and/or frequency-dependent gain of the audio signal. In other words, the processor 106 processes the audio signal based on the information stored in PAF file 112-2 specific to the user using the hearing aid system 100 and the used terminal hearing device 120.

The processor 106 provides the processed audio signal 132 to the wireless communication terminal interface 114. The wireless communication terminal interface 114 provides the amplified audio signal 132 in audio packets to the wireless communication terminal interface 118 of the terminal hearing device 120.

The terminal hearing device 120 includes a sound output device (also denoted as sound generation device), e.g. an audio speaker or other type of transducer that generates sound waves or mechanical vibrations that the user perceives as sound.

In operation, the communication device 110-1 can wirelessly transmit audio packets via a wireless communication link 116, which can be received by the terminal hearing device 120. The audio packets can be transmitted and received through wireless links using wireless communication protocols, such as Bluetooth or Wi-Fi® (based on the IEEE 802.11 family of standards of the Institute of Electrical and Electronics Engineers), or any other suitable radio frequency (RF) communication protocol. The Bluetooth Core Specification specifies the Bluetooth Classic variant of Bluetooth, also known as Bluetooth Basic Rate/Enhanced Data Rate™ (Bluetooth BR/EDR™). The Bluetooth Core Specification further specifies the Bluetooth Low Energy variant of Bluetooth, also known as Bluetooth LE, or BLE. The communication device 110-1 and the terminal hearing device 120 may be configured to support the A2DP which is suitable for audio streaming from the communication device to the terminal hearing device, e.g. streaming of a mono or stereo audio stream, and the "hands-free profile" (HFP). Both profiles offer a point-to-point link from the communication device 110-1 as an audio source to the terminal hearing device 120 as an audio destination.

In general, the communication device 110-1, 110-2 may be a mobile phone, e.g., a smartphone, such as an iPhone, Android, Blackberry, etc., a Digital Enhanced Cordless Telecommunications ("DECT") phone, a landline phones, tablets, a media players, e.g., iPod, MP3 player, etc.), a computer, e.g., desktop or laptop, PC, Apple computer, etc.; an audio/video (A/V) wireless communication terminal that can be part of a home entertainment or home theater system, for example, a car audio system or circuitry within the car, remote control, an accessory electronic device, a wireless speaker, or a smart watch, or a Cloud computing device, or a specifically designed universal serial bus (USB) drive.

In general, the terminal hearing device 120 can be a prescription device or a non-prescription device configured to be worn on or near a human head. A prescription device may include an ear-piece, e.g. earphones, specifically adapted to the ear canal of the user. A non-prescription may be a conventional headphone, a headset, an ear bud-set, as example. Different styles of terminal hearing devices 120 exist in the form of behind-the-ear (BTE), in-the-ear (ITE), completely-in-canal (CIC) types, as well as hybrid designs consisting of an outside-the-ear part and an in-the-ear part. A terminal hearing device 120 may be a hearing prosthesis, cochlear implants, earphones, headphones, ear buds, a headset or any other kind of a personal terminal hearing device 120.

The processing in the processor 106 may include, in addition to the audio signal and the information stored in the PAF file 112-2 inputting context data into a machine learning algorithm. The context data may be derived from the audio signal 102, e.g. based on a noise level or audio spectrum.

The machine learning algorithm may be trained with historical context data to classify the terminal hearing device 120, e.g. as one of a plurality of potential predetermined terminal hearing devices 120-*j* (with j being between 1 and M, and M being the total number of terminal hearing devices of a user). The machine learning algorithm may include a neuronal network, a statistical signal processing and/or a support vector machine. In general, the machine learning algorithm may be based on a function, which has input data in form of context data and which outputs a classification correlated to the context data. The function may include weights, which can be adjusted during training. During training, historical data or training data, e.g. historical context data and corresponding to historical classifications may be used for adjusting the weights. However, the training may also take place during the usage of the hearing aid system 100. As an example, the machine learning algorithm may be based on weights, which may be adjusted during learning. When a user establishes a communication connection between a communication device and the terminal hearing device, the machine learning algorithm may be trained with context data and the metadata of the terminal hearing device. An algorithm may be used to adapt the weighting while learning from user input. As an example, the user may manually choose another speaker to be listened to, e.g. active listening or conversing with a specific subset of individuals. In addition, user feedback may be reference data for the machine learning algorithm.

The metadata of the terminal hearing device 120 and the context data of the audio signal may be input into the machine learning algorithm. For example, the machine learning algorithm may include an artificial neuronal network, such as a convolutional neuronal network. Alternatively, or in addition, the machine learning algorithm may include other types of trainable algorithm, such as support vector machines, pattern recognition algorithm, statistical algorithm, etc. The metadata may be audio reproduction feature of the terminal hearing device and may contain information about unique IDs, names, network address, etc.

The terminal hearing device 120 may include a speaker 124, e.g. an electro-acoustic transducer configured to convert audio information into sound.

The terminal hearing device 120 may include one or more terminal hearing unit(s), e.g. one intended to be worn for the left ear and another for the right ear of the user. Terminal hearing units may be linked to one another, e.g. in case of a binaural hearing system. For example, the terminal hearing units may be linked together to allow communication between the two terminal hearing units. The terminal hearing device 120 is preferably powered by a replaceable or rechargeable battery.

In an alternative example, the hearing aid system 100 may be used to augment the hearing of normal hearing persons, for instance by means of noise suppression, to the provision of audio signal 102 originating from remote sources, e.g., within the context of audio communication, and for hearing protection.

The terminal hearing device 120 may include at least one processor 122 coupled to a wireless communication terminal interface 118; and a memory 138 that may store (a copy of) the PAF file 112-1 and may be coupled to the processor 122, wherein the processor 122 may be configured to provide 140 the PAF file 112-1, e.g. a copy thereof, to the wireless communication terminal interface 118 for transmitting the PAF file to a communication device 110-1 paired with the terminal hearing device 120, wherein the PAF file 112-1 may include personal auditability feature of a predetermined user and an audio reproduction feature of the predetermined terminal hearing device 120.

Figure 2A:
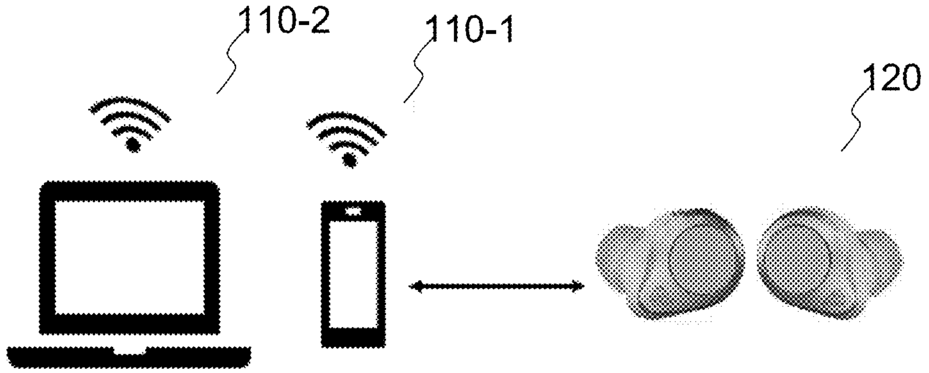
FIG. 2A to FIG. 2C illustrate schematic diagrams of a hearing aid system.
Figure 2B:
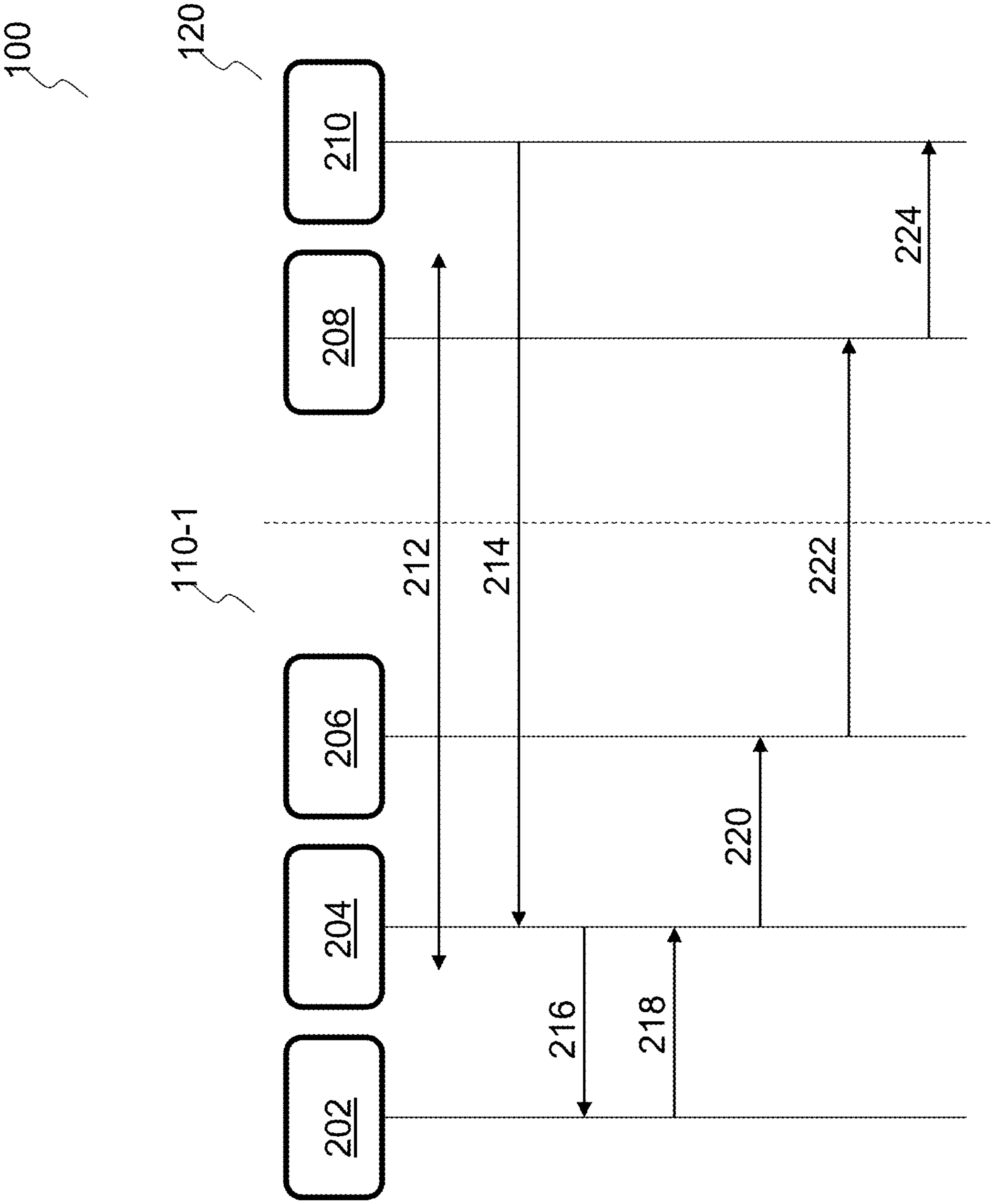
Figure 2C:
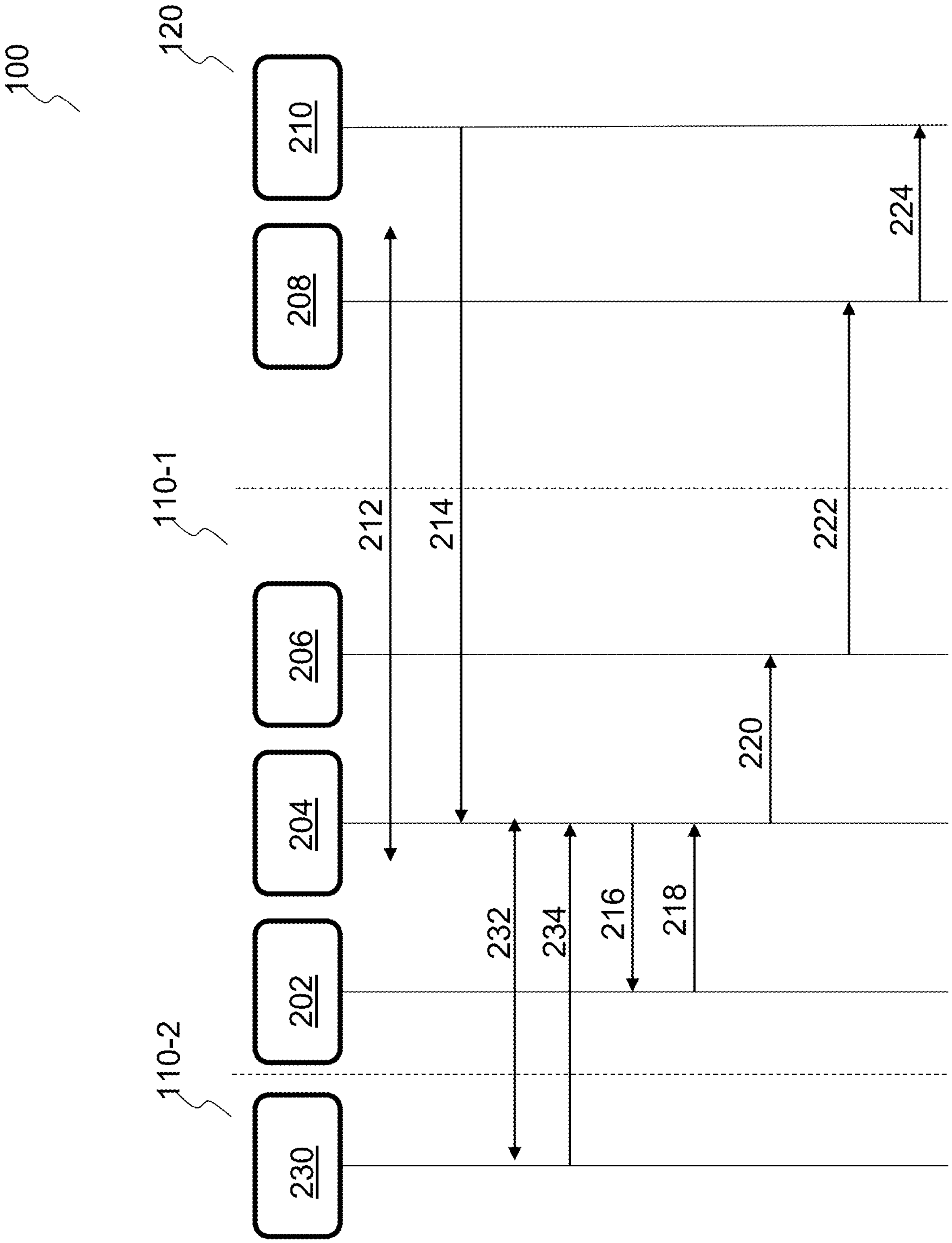

FIG. 2A to FIG. 2C illustrate schematic diagrams of a hearing aid system 100. Here, a terminal hearing device 120 may be coupled to a first communication device 110-1, e.g. a smartphone, and/or a second communication device 110-2, e.g. a computer, one at a time or simultaneously.

As an example, tracking and management of the pairing between the terminal hearing device 120 and the first communication device 110-1 and audio stream may be performed by the terminal hearing device 120. The PAF file (see FIG. 1A and FIG. 1B) may be stored on the terminal hearing device 120 and may be shared with connected communication devices 110-1, 110-2, e.g. as part of a pairing phase. The PAF file can include application specific details, e.g. "don't apply on spatial", "increase volume for conference calls". Information in the PAF file may be applied to BT subsystems and/or audio systems. The PAF file may be transferred over BT to the communication device(s) 110-1, 110-2.

Alternatively, or in addition, the PAF file may be stored in a cloud, e.g. in one or more communication devices 110-1, 110-2. The PAF file may be automatically applied to each of the communication devices.

Changes in the PAF file, e.g. audio preferences, of a first terminal hearing device may be automatically applied to a PAF file corresponding to a second terminal hearing device of the user (not illustrated). Orchestration of the wireless communication link between the terminal hearing device and the communication device may be performed through the cloud.

FIG. 2B shows a flow diagram for a terminal hearing device-centric message flow. Illustrated are different instances of the communication device 110-1 and the terminal hearing device 120, e.g. the application instance 202, the operating system instances 204, 210, and the firmware instances 206, 208, e.g. audio/BT firmware. The vertical shows a message flow between the instances. As an example, a discovery 212 of the communication device, e.g. based on conventional BT, including a discovery whether the communication device 110-1 supports the PAF file. The terminal hearing device 120 may transmit 214 the PAF file to the communication device 110-1. The operating system 204 may notify 216 the hearing aid app 202 about the received PAF file. The hearing aid app 202 may apply 218 any adaptation on the PAF file if needed. The updated PAF file may be applied 220 on the audio stream/the BT firmware 206. An updated audio stream may be transferred 222 to the firmware of the terminal hearing device 120, e.g. via a BT communication link. The operating system 210 of the terminal hearing device 120 may output the audio stream to the user. Alternatively, or in addition, in case of a cloud-centric hearing aid system, the message flow of FIG. 2B may include a query 232 of a PAF file for a predetermined user and the used terminal hearing device 120 to a second communication device 110-2, e.g. a cloud terminal 110-2. The second communication device 110-2 may than configure 234 the PAF file in the first communication device 110-1.

Figure 3:
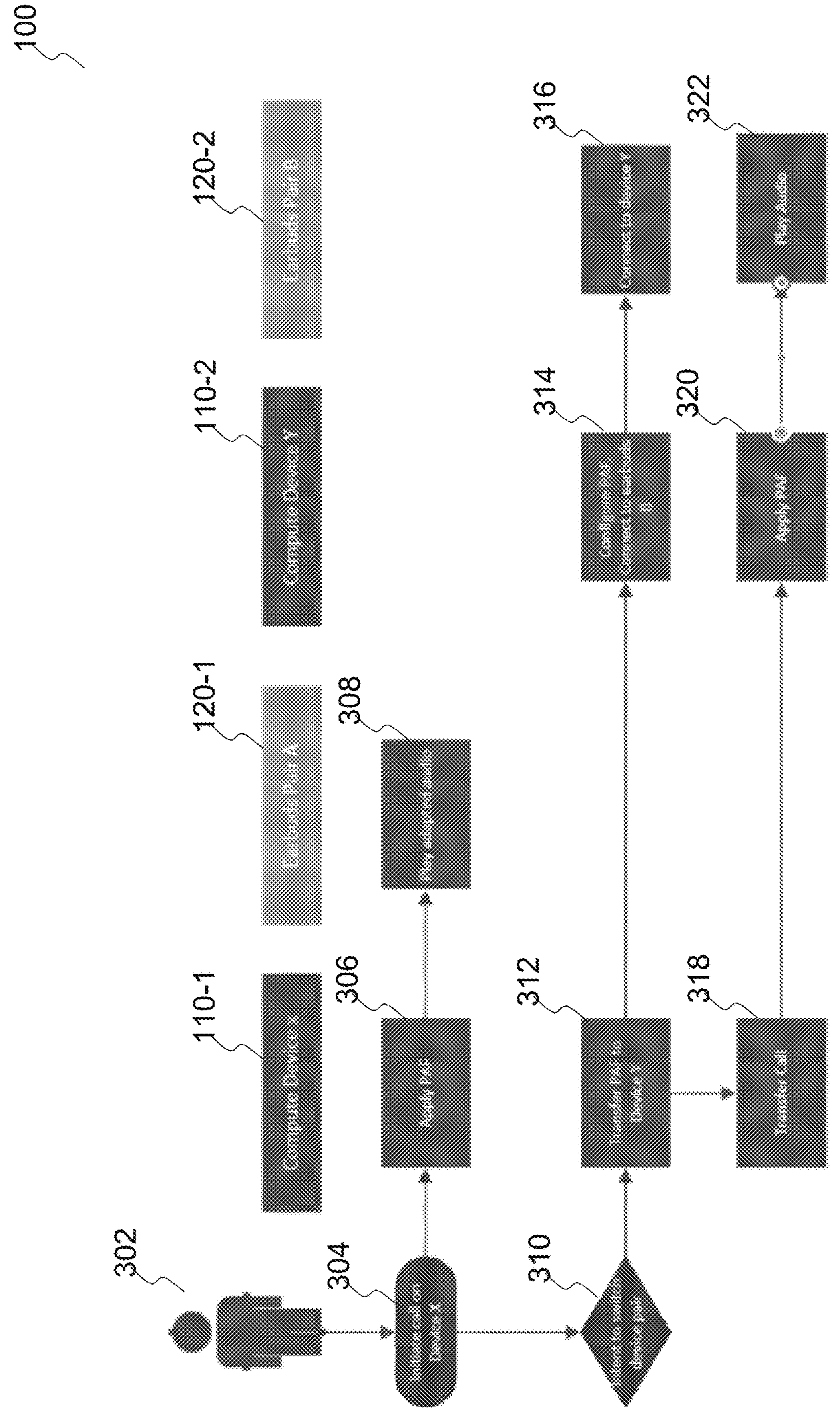
FIG. 3 illustrates an exemplary flow chart for a hearing aid system.

FIG. 3 illustrates a flow chart of a method for operating a hearing aid system that enables through single button press and/or through inferring human intent a switch of a used communication device from a first communication device 110-1 to a second communication device 110-2. As an example, human intent may be inferred in the middle of a conference call device to switch to a phone as the communication device when the user picks up the phone and walks away. The phone as the communication device proceeds the conference call. The conference call device or the phone terminal hearing device may configure the terminal hearing device to work with the phone. The transfer from the conference call device to the phone may be seamless, e.g. no words are lost.

As an example, a user 302 initiates 304 a call using a first communication device 110-1 and earbuds 120-1 as a first terminal hearing device 120-1. The PAF file may be applied 306 in the first communication device 110-1 and an adapted audio stream is played 308 by the first terminal hearing device 120-1 as described above.

The user 302 may intent 310 to switch to a second communication device 110-2 still using the first terminal hearing device 120-1 or switching to a second terminal hearing device 120-2. The intent 310 to switch the communication device can be explicit, e.g. the user 302 chooses from a list of predetermined communication devices and/or communication device-terminal hearing device pairs. Alternatively, or in addition, the intention may be implicit, e.g. the user 302 may move away from a first communication device, e.g. a PC, with a headset as a terminal hearing device 120 to a second terminal hearing device 120-2, e.g. a phone. The phone call transfers from the PC 110-1 to the phone 110-2. The user 302 may be asked if a switching of the communication device shall be performed, e.g. is actually intended.

If a switching of the communication device is intended, the first communication device 110-1 may transfer 312 the PAF file to the second communication device. In case the first terminal hearing device is further used, the first communication device transfers 318 the phone call to the second communication device 110-2 that applies the PAF file 320 accordingly and provides an adapted audio stream to the first terminal hearing device 120-1 that plays 322 the adapted audio stream for the user 308. In case a second terminal hearing device 120-2 is to be used, the second communication device 110-2 may configure 314 the corresponding PAF file and connect to the second terminal hearing device 120-2, and the second terminal hearing device connects 316 to the second communication device 110-2 and plays the adapted audio stream.

Thus, the call may automatically transfer from the first communication device 110-1 to the second communication device 110-2 with the correct terminal hearing device 120, and the correct audio settings. The wireless communication link between the terminal hearing device 120 and the first communication device 110-1 may be disconnected.

Figure 4:
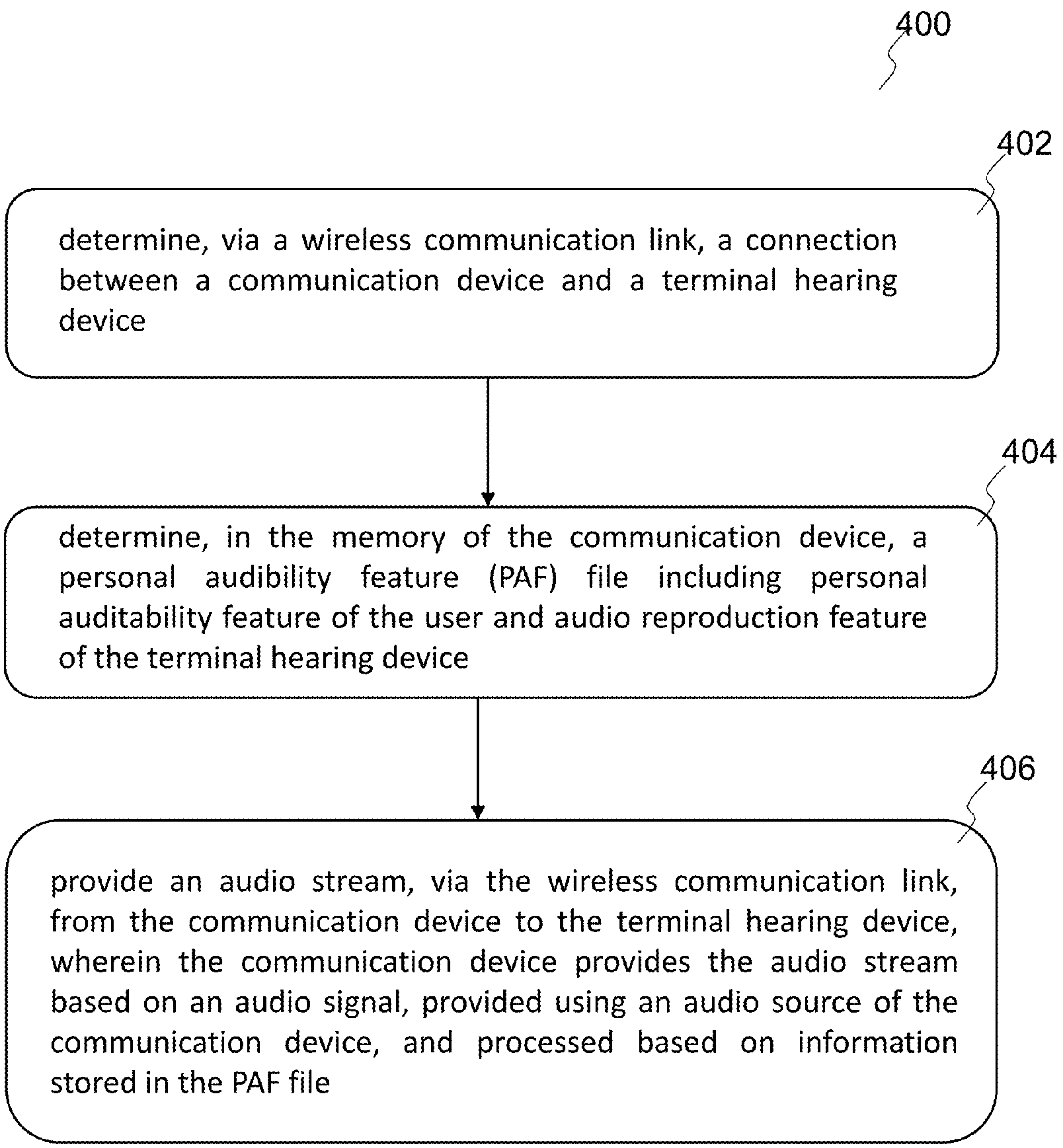
FIG. 4 illustrates an exemplary flow chart of a method for operating a hearing aid system.

FIG. 4 illustrated a flow chart of a method for amplifying an audio stream. A non-transitory computer readable medium may include instructions which, if executed by one or more processors, e.g. of a first communication device, cause the one or more processors to: determine 402, via a wireless communication link, a connection between a first communication device and a terminal hearing device; determine 404, in the memory of the first communication device, a personal audibility feature (PAF) file including personal auditability feature of the user and audio reproduction feature of the terminal hearing device; and provide 406 an audio stream, via the wireless communication link, from the first communication device to the terminal hearing device, wherein the communication device provides the audio stream based on an audio signal, provided using an audio source of the first communication device, and processed based on information stored in the PAF file.

The method for operating a hearing aid system may include: providing an audio stream from the first communication device to a first terminal hearing device through a first wireless communication link. The audio stream may be based on a personalized audibility feature of a predetermined user and an audio reproduction feature of the terminal hearing device. The method may further include a set-up of a second wireless communication link between the first terminal hearing device and a second communication device; providing the second audio stream through the second wireless communication link, and a terminating of at least the audio stream of the first communication link.

The first communication device may transmit the PAF file to the second communication device when the terminal hearing device forms the wireless communication link with the second communication device. Alternatively, or in addition, the first communication device may transmit the PAF file 1 to the terminal hearing device when the terminal hearing device forms the wireless communication link with the second communication device. Alternatively, or in addition, the communication device may transmit the PAF file to the second communication device when the first terminal hearing device forms the wireless communication link with the first communication device. Alternatively, or in addition, the first communication device may transmit the PAF file to the second communication device when the first terminal hearing device forms a wireless communication link with the second communication device.

For example, the instructions may be part of a program that may be executed in the processor of the communication device of the hearing aid system. The computer-readable medium may be a memory of this communication device. The program also may be executed by the processor of the communication device and the computer-readable medium may be a memory of the communication device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. The computer-readable medium may be a non-transitory or transitory medium.

As used herein, a program is a set of instructions that implement a processing algorithm for setting the audio frequency shaping or compensation provided in the processor. An amplification algorithm may be an example of a processing algorithm. The amplification algorithms may also be referred to as "gain-frequency response" algorithms.

The PAF file may be generated by software, e.g. an application installed on the communication device that guides the user through a do-it-yourself audiometric testing process. In yet another embodiment, audiometric testing information needed to generate the hearing loss profile may be acquired by the communication device itself. This audiometric testing information may be uploaded from the communication device via an interface to the internet, through which it is communicated to a listening device programming entity.

The PAF file may include an audiogram representing a hearing impairment of the user in graphical format or in tabular form in the PAF file. The audiogram indicates a compensation amplification (e.g. in decibels) needed as a function of frequency (e.g. in Hertz) across the audible band to reduce the hearing impairment of the user.

The processor of the communication device loads the personal audibility profile from the PAF file and based thereon determines a best-fit hearing correction algorithm for the user for the audio signal provided from the audio source of the communication device. The best-fit algorithm may define the optimum amplitude-versus-frequency compensation function to compensate for the hearing impairment of the user as indicated by the personal audibility profile. The processor of the communication device may upload the best-fit hearing correction algorithm to the PAF file.

EXAMPLES

The examples set forth herein are illustrative and not exhaustive.

Example 1 is a terminal hearing device, including: at least one processor coupled to a wireless communication terminal interface; and a memory having a personal audibility feature (PAF) file stored therein and coupled to the processor, wherein the processor is configured to provide the PAF file to the wireless communication terminal interface for transmitting the PAF file to a communication device paired with the terminal hearing device, wherein the PAF file includes personal auditability feature of a predetermined user and an audio reproduction feature of a predetermined terminal hearing device.

In Example 2, the subject matter of Example 1 can optionally include that the PAF file is a single file including the personal auditability feature of the user and the audio reproduction feature of the terminal hearing device.

In Example 3, the subject matter of any of Example 1 or 2 can optionally include that the personal auditability feature includes a personal audibility curve.

In Example 4, the subject matter of any of Example 1 to 3 can optionally include that the personal auditability feature includes at least one personal audibility preference profile.

In Example 5, the subject matter of any of Example 1 to 4 can optionally include that the audio reproduction feature includes information of a unique ID, a name, a network address and/or a classification of the terminal hearing device.

In Example 6, the subject matter of any of Example 1 to 5 can optionally include at least one earphone.

In Example 7, the subject matter of any of Example 1 to 6 can optionally include that the wireless communication terminal interface configured as Bluetooth interface, in particular a Bluetooth Low Energy interface.

In Example 8, the subject matter of any of Example 1 to 7 can optionally include that the terminal hearing device is an in-the-ear phone.

In Example 9, the subject matter of any of Example 1 to 8 can optionally include that the terminal hearing device includes a first terminal hearing unit and a second terminal hearing unit, wherein the first terminal hearing unit includes a first communication terminal interface for a wireless communication link with a communication device, and wherein the first and second terminal hearing units include second communication terminals respectively for a wireless communication link between the first and second terminal hearing units.

Example 10 is a communication device, including: at least one processor coupled to a communication terminal interface; and a memory having a personal audibility feature (PAF) file stored therein and coupled to the processor, wherein the processor is configured to provide the PAF file to at least one other communication device through the communication terminal interface, wherein the PAF file includes personal auditability feature of a predetermined user and an audio reproduction feature of a predetermined terminal hearing device.

In Example 11, the subject matter Example 10 can optionally include that the personal auditability feature includes a personal audibility curve.

In Example 12, the subject matter of any of Example 10 or 11 can optionally include that the personal auditability feature includes at least one personal audibility preference profile.

In Example 13, the subject matter of any of Example 10 to 12 can optionally include that the audio reproduction feature includes information of a unique ID, a name, a network address and/or a classification of the predetermined terminal hearing device.

In Example 14, the subject matter of any of Example 10 to 12 can optionally include that the processor is configured to process an audio signal based on the PAF file and a machine learning algorithm.

In Example 15, the subject matter of any of Example 10 to 14 can optionally include a second communication terminal interface, wherein the communication device is configured to provide an audio stream to the predetermined terminal hearing device using the second communication terminal interface, wherein the audio stream is based on information stored in the PAF file.

In Example 16, the subject matter of any of Example 10 to 15 can optionally include that the processor is configured to provide the PAF file to the other communication device through the communication terminal interface when the other communication device reports a wireless communication link with the predetermined terminal hearing device to the communication device via the communication terminal interface.

In Example 17, the subject matter of any of Example 10 to 16 can optionally be configured to transmit the PAF file stored in the memory to the other communication device when the communication device formed a communication link with the predetermined terminal hearing device.

In Example 18, the subject matter of any of Example 10 to 17 can optionally include that the wireless communication terminal interface is configured as Bluetooth interface, in particular a Bluetooth Low Energy interface.

In Example 19, the subject matter of any of Example 10 to 18 can optionally be configured as a mobile communication device.

In Example 20, the subject matter of any of Example 10 to 19 can optionally be configured as a Cloud terminal.

Example 21 is a method for operating a hearing aid system, the hearing aid system including a terminal hearing device, a first communication device and a second communication device; the method including: providing an audio stream from a first communication device to a first terminal hearing device through a first wireless communication link, and wherein the audio stream is based on a personalized audibility feature of a predetermined user and an audio reproduction feature of the terminal hearing device; set up a second wireless communication link between the first terminal hearing device and a second communication device; providing the second audio stream through the second wireless communication link, and terminating at least the audio stream of the first communication link.

In Example 22, the subject matter of Example 21 can optionally include that the communication device transmits the PAF file to the other communication device when the terminal hearing device forms the wireless communication link with the other communication device.

In Example 23, the subject matter of any of Example 21 or 22 can optionally include that the communication device transmits the PAF file to the terminal hearing device when the terminal hearing device forms the wireless communication link with the other communication device.

In Example 24, the subject matter of any of Example 21 to 23 can optionally include that the communication device transmits the PAF file to the other communication device when the first terminal hearing device forms the wireless communication link with the first communication device.

In Example 25, the subject matter of any of Example 21 to 24 can optionally include that the communication device transmits the PAF file to the other communication device when the first terminal hearing device forms a wireless communication link with the second communication device.

The word “exemplary” is used herein to mean “serving as an example, instance, or illustration.” Any example or design described herein as “exemplary” is not necessarily to be construed as preferred or advantageous over other examples or designs.

The words “plurality” and “multiple” in the description or the claims expressly refer to a quantity greater than one. The terms “group (of)”, “set [of]”, “collection (of)”, “series (of)”, “sequence (of)”, “grouping (of)”, etc., and the like in the description or in the claims refer to a quantity equal to or greater than one, i.e. one or more. Any term expressed in plural form that does not expressly state “plurality” or “multiple” likewise refers to a quantity equal to or greater than one.

The terms “processor” or “controller” as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term “connected” can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more components from a single component, mounting two or more components onto a common chassis to form an integrated component, executing discrete software components on a common processor core, etc. Conversely, skilled persons will recognize the possibility to separate a single element into two or more discrete elements, such as splitting a single component into two or more separate component, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A terminal hearing device, comprising:

at least one processor coupled to a wireless communication terminal interface; and a memory having a personal audibility feature (PAF) file stored therein and coupled to the processor, wherein the processor is configured to provide the PAF file to the wireless communication terminal interface for transmitting the PAF file to a communication device paired with the terminal hearing device, wherein the PAF file comprises a personal audibility feature of a predetermined user and an audio reproduction feature of a predetermined terminal hearing device, and wherein the processor is further configured to:

receive from the communication device audio context data associated with an audio spectrum of sound in an environment of the predetermined user;

access a personal audibility feature and an audio reproduction feature from the PAF file based on the audio context data;

transmit the personal audibility feature and the audio reproduction feature to the communication device;

receive an audio input stream from the communication device; and produce audio at the terminal hearing device based on the audio input stream.

2. The terminal hearing device of claim 1, wherein the PAF file is a single file comprising the personal audibility feature of the predetermined user and the audio reproduction feature of the terminal hearing device.

3. The terminal hearing device of claim 1, wherein the personal audibility feature comprises a personal audibility curve.

4. The terminal hearing device of claim 1, wherein the personal audibility feature comprises at least one personal audibility preference profile.

5. The terminal hearing device of claim 1, wherein the audio reproduction feature comprises information of a unique ID, a name, a network address and/or a classification of the terminal hearing device.

6. The terminal hearing device of claim 1, comprising at least one earphone.

7. The terminal hearing device of claim 1, wherein the wireless communication terminal interface configured as Bluetooth interface, in particular a Bluetooth Low Energy interface.

8. The terminal hearing device of claim 1, wherein the terminal hearing device is an in-the-ear phone.

9. The terminal hearing device of claim 1, wherein the terminal hearing device comprises a first terminal hearing unit and a second terminal hearing unit, wherein the first terminal hearing unit comprises a first communication terminal interface for a wireless communication link with the communication device, and wherein the first and second terminal hearing units comprise second communication terminals respectively for a wireless communication link between the first and second terminal hearing units.

10. A communication device, comprising:

at least one processor coupled to a communication terminal interface; and a memory having a personal audibility feature (PAF) file stored therein and coupled to the processor, wherein the processor is configured to provide the PAF file to at least one other communication device through the communication terminal interface, wherein the PAF file comprises personal audibility feature of a predetermined user and an audio reproduction feature of a predetermined terminal hearing device, and wherein the other communication device comprises a communication device processor configured to:

access a personal audibility feature and an audio reproduction feature from the PAF file;

receive an audio input stream;

identify, from the audio input stream, a hearing condition classification associated with a classified conversation in which the predetermined user is a participant;

derive, from the audio input stream, audio context data based on an audio spectrum of the classified conversation;

process the audio input stream into an audio output stream, based on the personal audibility feature, the audio reproduction feature, and the hearing condition classification; and transmit the audio output stream to the terminal hearing device over the communication terminal interface.

11. The communication device of claim 10, wherein the personal audibility feature comprises a personal audibility curve.

12. The communication device of claim 10, wherein the personal audibility feature comprises at least one personal audibility preference profile.

13. The communication device of claim 10, wherein the audio reproduction feature comprises information of a unique ID, a name, a network address and/or a classification of the predetermined terminal hearing device.

14. The communication device of claim 10, wherein the communication device processor is configured to process an audio signal based on the PAF file and a machine learning algorithm.

15. The communication device of claim 10, further comprising a second communication terminal interface, wherein the communication device is configured to provide an audio stream to the predetermined terminal hearing device using the second communication terminal interface, wherein the audio stream is based on information stored in the PAF file.

16. The communication device of claim 10, wherein the processor is configured to provide the PAF file to the other communication device through the communication terminal interface when the other communication device reports a wireless communication link with the predetermined terminal hearing device to the communication device via the communication terminal interface.

17. The communication device of claim 10, configured to transmit the PAF file stored in the memory to the other communication device when the communication device formed a communication link with the predetermined terminal hearing device.

18. The communication device of claim 10, wherein the communication terminal interface is configured as Bluetooth interface, in particular a Bluetooth Low Energy interface.

19. The communication device of claim 10, configured as a mobile communication device.

20. The communication device of claim 10, configured as a Cloud terminal.

* * * * *